May 8, 1962
W. F. MOHLER ETAL
3,032,951
TUBE FILLING MACHINE
Filed Oct. 14, 1960
3 Sheets-Sheet 1
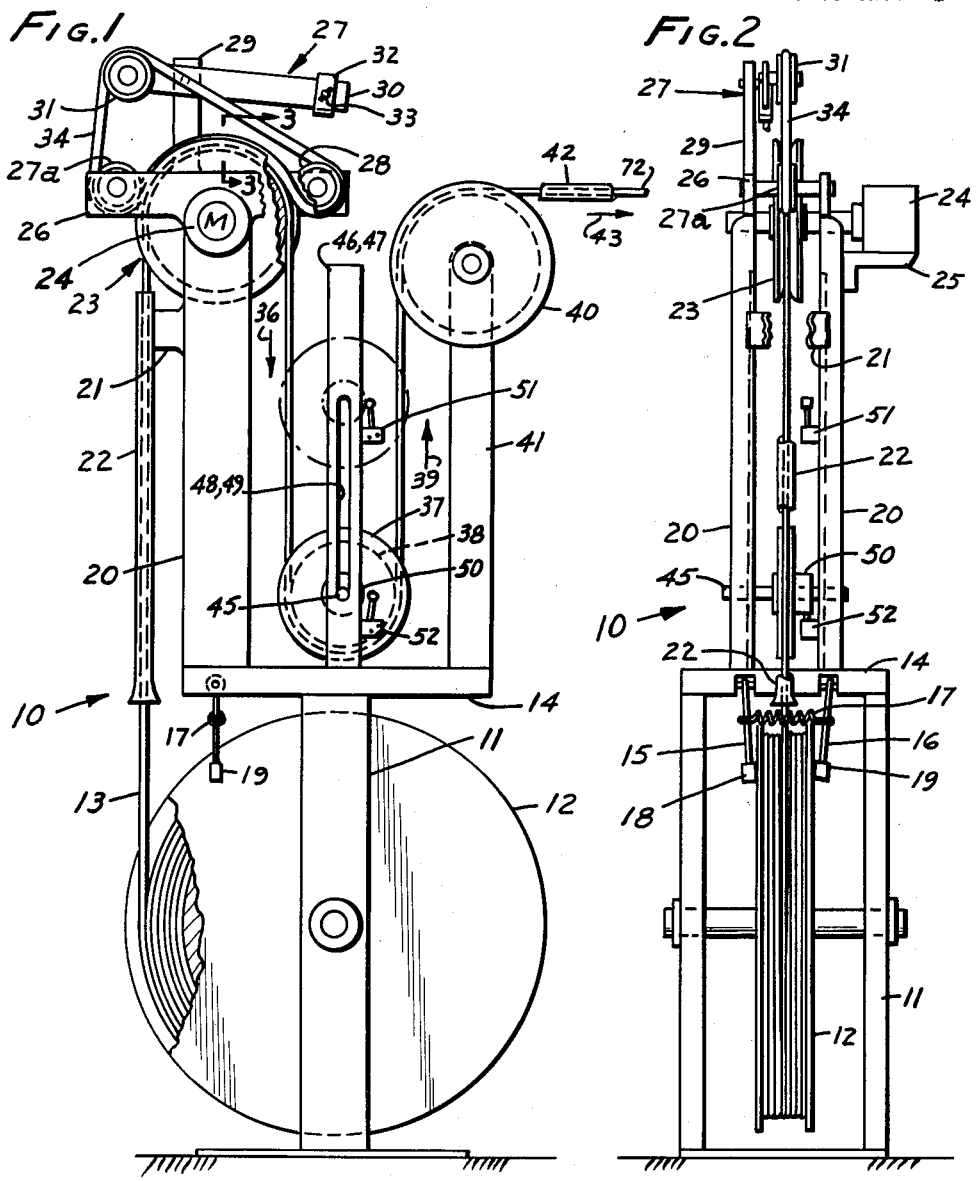
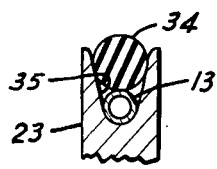
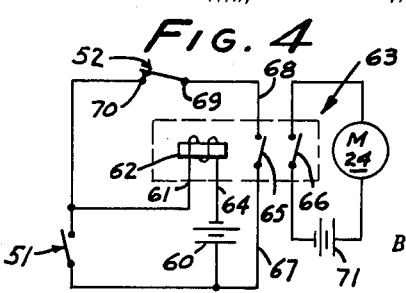
INVENTORS:
WILLIAM F. MOHLER,
IRVING ABERBOM
BY
Angus & Mon
ATTORNEYS.

May 8, 1962 W. F. MOHLER ETAL 3,032,951
TUBE FILLING MACHINE

Filed Oct. 14, 1960 3 Sheets-Sheet 2

INVENTORS:
WILLIAM F. MOHLER,
IRVING ABERBOM
BY
ATTORNEYS.

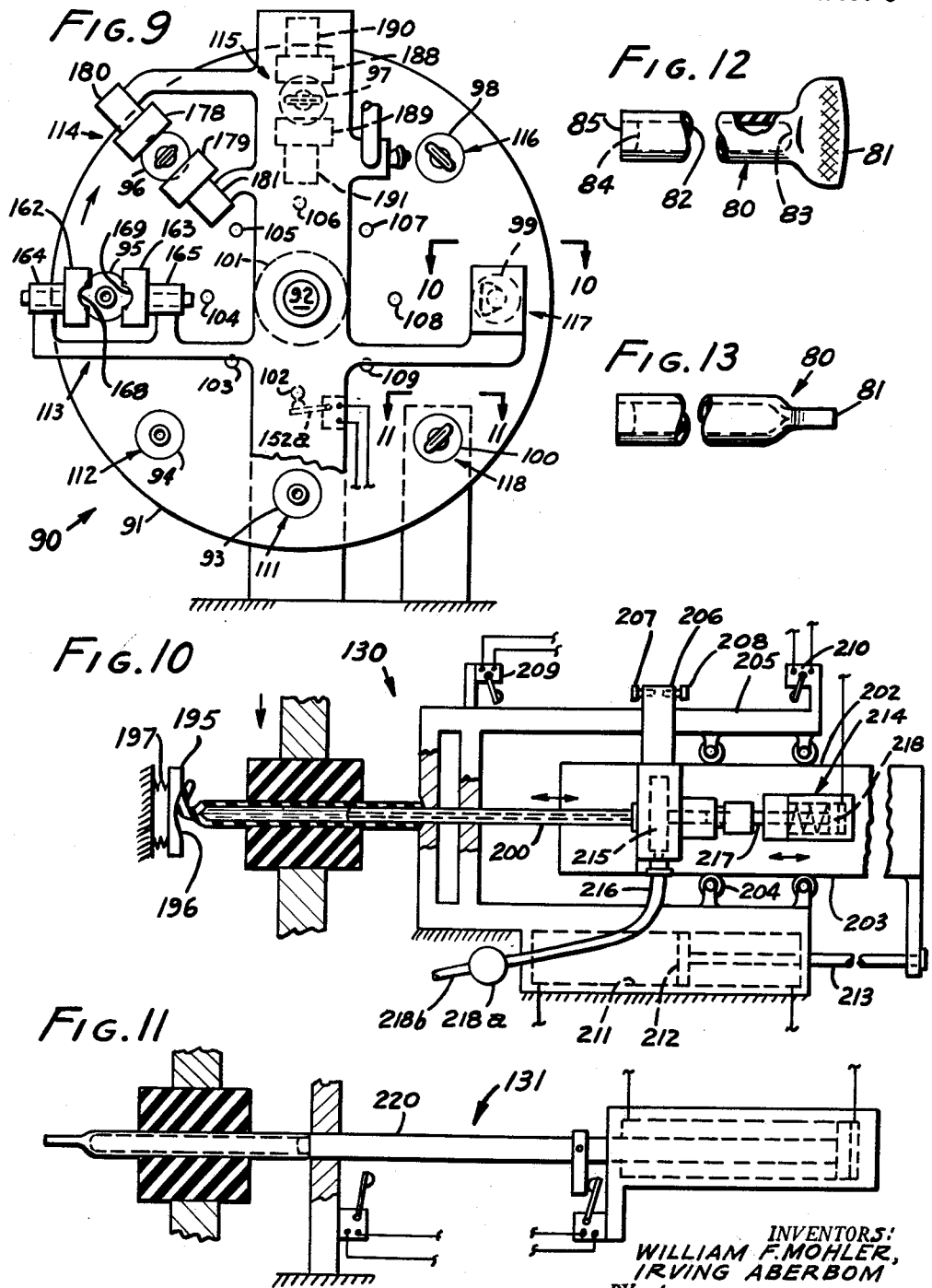

United States Patent Office 3,032,951
Patented May 8, 1962

3,032,951
TUBE FILLING MACHINE
William F. Mohler, Gardena, and Irving Aberbom, Los Angeles, Calif., assignors to Ronson Hydraulic Units Corp., Pasadena, Calif., a corporation of California
Filed Oct. 4, 1960, Ser. No. 62,607
8 Claims. (Cl. 53—141)

This invention relates to a machine for cutting off and sealing one end of a piece of tubing, such as polyethylene tubing, and filling the tubing with a liquid or semi-solid such as a silicone grease.

The object of this invention is to provide a machine which can readily produce in quantity and in continuous operation, sleeves commonly known as "B" sleeves which are short pieces of thin-walled polyethylene tubing closed at one end and filled with silicone grease free of any voids.

The preparation of such sleeves involves many difficult manufacturing problems. For one, the product must be manufactured within fairly close dimensional tolerances which means that the thin-walled tubing must be handled in a uniform manner so that successive lengths will not vary either in length or diameter. Furthermore, because the silicone grease is electrically conductive and is ordinarily used to aid in making a splice, the tube needs to be filled to a given level, and must be free of bubbles. In addition, the tubing must be filled to such a depth that the silicone will be retained in the tubing and in a predictable and reliable amount, and so that it will not leak out by virtue of being over-filled. Furthermore, the end of the tubing which is sealed must be reliably sealed so that there will be no leakage there, so that as the sleeve is placed over a splice, the silicone will be force around the wires being spliced, and not squeezed out the closed end.

It is an object of this invention to meet the manufacturing demands imposed by the particular product and to provide a machine which will expeditiously manufacture the same.

A device according to this invention includes means for feeding the tubing to a manufacturing station such that the tubing will arrive in a predetermined state of tension and elongation. At the manufacturing station there is a shuttle clamp arrangement for feeding individual lengths of tubing to an index plate, and cutting off the correct length. This plate includes means for registering the lengths at individual work stations. Heating clamp means are provided for sealing one end of the tubing and fluid cooling means are provided for cooling the sealed end after the sealing operation. Filling means are provided for filling the tubing with silicone grease through its open end, and ejector means are provided for expelling the filled tubing from the index plate.

The above and other features of this invention will be fully understood from the following detailed description and the accompanying drawings, in which:

FIG. 1 is a side elevation, partly in cutaway cross-section, of a portion of a device according to the invention;

FIG. 2 is a left-hand view of FIG. 1;

FIG. 3 is a fragmentary cross-section taken at line 3—3 of FIG. 1;

FIG. 4 is a drawing of a circuit suitable for controlling the portion of the machinery shown in FIG. 1;

Figure 5:
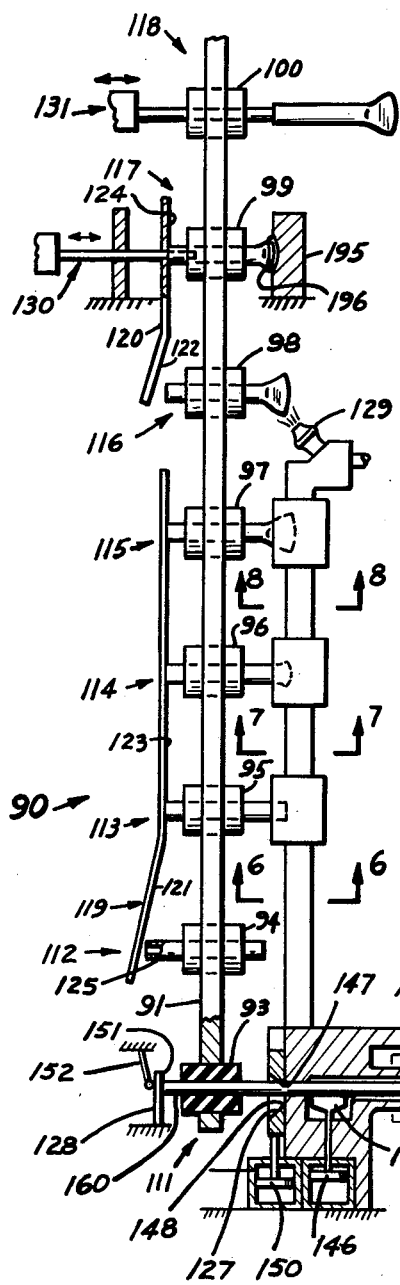
FIG. 5 is a side elevation, partly in cutaway cross-section, and partly in developed notation, showing a portion of a machine according to the invention.
Figure 6:
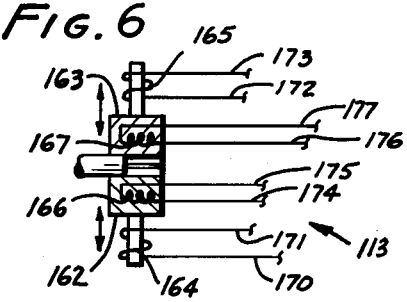
Figure 7:
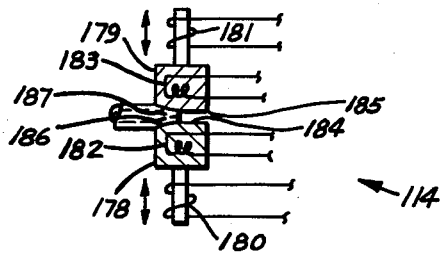
Figure 8:
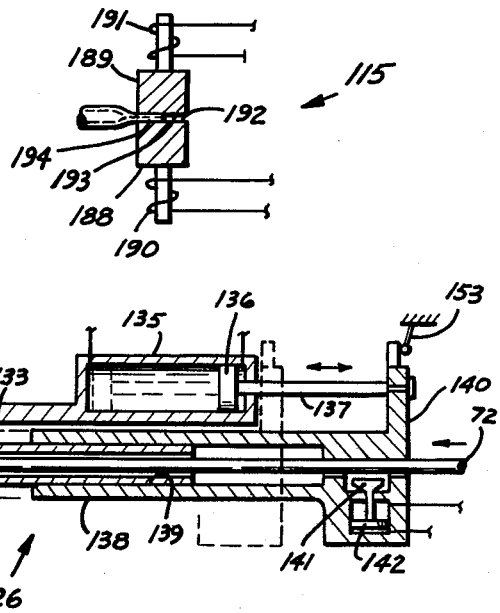

FIGS. 6, 7, and 8 are side elevations, partly in cutaway cross-section and partly in schematic notation, showing portions of FIG. 5;

FIG. 9 is a right-hand view of a portion of FIG. 5;

FIGS. 10 and 11 are fragmentary illustrations, partly in cutaway cross-section and partly in elevation, of portions of FIG. 5; and FIGS. 12 and 13 are top and side views, respectively, of the product produced by the invention.

The product produced by the device shown in the drawings is illustrated in FIGS. 12 and 13. The product consists of a length 80 of tubing which is sealed by crimping at its closed end 81, and filled with silicone grease 82 without bubbles from its inner end 83 to a location shown by a meniscus 84 spaced from the open end 85 of the tube. The tubing utilized to form the structure of this device is thin-walled polyethylene tubing, which is readily elongatable. Because the end product is required to be dimensionally stable and to have the same dimensions from piece to piece, it is evident that it is essential for the material to be handled uniformly and to arrive at the manufacturing point in a uniform condition of elongation and set. For that reason, the machine shown in FIGS. 1–4 is provided for feeding the tubing to this device. This portion 10 of the machine includes a frame 11 to which there is mounted a reel 12 of elongatable material 13 which is to be dispensed. This material may be such as thin-walled polyethylene tubing, for example, or it could be strip or sheet material to be turned into tubing, should that technique be preferred.

A crossbar 14 overhangs the reel. A pair of pivotable brakearms 15, 16 (FIG. 2) are suspended from crossbar 14, and are biased toward each other and against the reel by a tension spring 17. Discs or wheels of friction-brake material 18, 19 are disposed at the ends of the brakearms to apply a restraining force on the reel to keep it from coasting. Material will thus be taken off the reel only as a result of a pull exerted on it. Material will not be released by the reel by coasting after the pull is stopped.

A pair of risers 20 extends upwardly from crossbar 14. These risers have flanges 21 which support a guide 22 through which the material passes. The guide centers the material, which may have originated from an off-center location on the reel's periphery.

A drive wheel 23 is journaled to risers 20. The drive wheel is driven by motor 24, which is mounted to a flange 25 on one of the risers.

Another pair of crossarms 26 journals engagement means 27, which means includes a pair of idler wheels 27a, 28. A fulcrum member 29 projects above crossarm 26 and supports a pivoted beam 30. At one end of the pivoted beam there is a third idler wheel 31, and at the opposite end of the beam from wheel 31 there is a counter-weight 32 with a thumb screw 33 to adjustably fix the counter-weight at some predetermined position along the beam. An endless belt 34 is wrapped around idler wheel 27a, 28, and 31 and bears downwardly atop the drive wheel. The tension on the belt is adjusted by placing the counter-weight along the beam at a location which will provide the desired load.

The dimensional relationship between the engagement means and the drive wheel are as shown in FIG. 3. The drive wheel has a peripheral V-groove 35 with a bottom radius which is about the same as the material of the tubing 13 being dispensed. Belt 34 is round, with a diameter such that the belt goes into the groove just far enough that it makes a light contact against tubing 13, and presses the tubing lightly against the drive wheel. The fit is not tight enough to substantially deform the tubing, but it is tight enough to hold the tubing in firm, non-slip engagement with the drive wheel. The walls of groove 35 prevent the belt from going in any farther. It will thereby be seen that the engagement means through belt 34 act to keep material 13 in engagement with the bottom of groove 35 in the drive wheel so that the tubing does not slip relative to the drive wheel. Then the drive wheel positively drives the tubing.

From the drive wheel, the tubing passes downwardly as shown by arrow 36, and passes beneath and in engagement with vertically reciprocable bias wheel 37. The bias wheel has a peripheral groove 38 in it in which the tubing fits. The tubing departs upwardly from the bias wheel in the direction shown by arrow 39, and then proceeds up and over take-off wheel 40 which is journaled to risers 41. The tubing thus has a U-shaped path which is open at its top. From take-off wheel 40, the tubing passes into a guide tube 42 and is conveyed to the point of use where it is utilized. The using device exerts a pull in the direction of arrow 43 to withdraw the tubing from the machine.

Bias wheel 37 has an axle 45 which projects from both sides thereof. A pair of guides 46, 47 have vertical slots 48, 49, respectively, therein. The axles are fitted into said slots and are vertically reciprocable therein. The wheel carries a cam 50 which is an enlargement of the axle.

Limit switches 51, 52 are mounted to the guides at vertically spaced positions thereon. Switch 51 is an upper start switch. Switch 52 is a lower stop switch.

A circuit responsive to the limit switches for operating motor 24 is shown in FIG. 4. This circuit and the motor will function to keep the length of the U-shaped path of material between the drive wheel and the take-off wheel between the limits defined when the bias wheel is in the bottom position shown in FIG. 1, and that shown in the upper position in phantom line in the same figure.

Battery 60, or some other source of electricity, is connected to start switch 51. This switch is spring-loaded to a normally open position. It is closed by contact of the cam against its actuator. One terminal of this switch is connected to the battery, and the other is connected to the first terminal 61 of coil 62 in a relay 63. Second terminal 64 of the coil is connected to the other terminal of the battery.

The relay has two off-on switches 65, 66 which are spring-loaded to a normally open position, and which are closed when the relay is actuated. Terminal 67 of switch 65 is connected to one side of the battery. Terminal 68 of this switch is connected to terminal 69 of stop switch 52. Stop switch 52 is spring-loaded to a normally closed position. It is opened when the cam makes contact with its actuator. Terminal 70 of switch 52 is connected to terminal 61 of the coil.

One terminal of switch 66 connects to motor 24, and the other terminal is connected to battery 71 or to some other source of motive power for the motor, the other terminal of the motor being connected to the other side of the battery.

Point 72 is shown in FIG. 5 where the material is supplied from the device of FIGS. 1–4 to be utilized by the manufacturing machine 90 shown in FIG. 5. This machine has a movable index plate 91 shown in FIGS. 5 and 9. Machines can be made having linearly movable index plates, but rotatable plates are ordinarily provided for general simplicity. The plate rotates about a central axis 92 and carries with it eight holders 93–100. These holders are sleeves which project on both sides of the plate and receive and carry with them lengths of tubing supplied to them. The index plate is turned by motor 101. The plate bears eight cams 102–109 which operate to stop the motor at stations to be described. The device has eight stations 111–118 which have various purposes to be described.

On the left-hand side of the index plate at shown in FIG. 5, there are a pair of spacer members 119, 120. These members have ramp sections 121, 122 and backup sections 123, 124, respectively. It will be seen that as the plate moves counter-clockwise in FIG. 9, or as the plate is developed in FIG. 1 in an upward direction, the left-hand end of the tube sections 125 will be moved by the ramp section up to the respective backup section so that at certain of the stations to be described, the tube sections will be accurately positioned to be worked on.

Station 111 is a tube supply station having as its purpose the withdrawal of tubing from point 72, its introduction to one of the holders, and its cutoff. This station includes a feeder mechanism 126, a cutoff die 127, and a stop 128. Station 112 has no function but exists to provide travel for the tube sections to reach and ride up on ramp section 121. Station 113 is a primary pre-heat station. Station 114 is a secondary pre-heat station. Station 115 is a sealing station.

Station 116 is a cooling station where a blast of air issues from a nozzle 129 to cool the heated sealed end of the tube. At this station ramp 122 is aligned with the tubing to guide the open end of the tubing toward backup section 124. Station 117 is a filler station whose filler mechanism 130 is shown in detail in FIG. 10. Station 118 is an ejector station where the filled tube is ejected from its respective holder. The ejector mechanism 131 is shown in detail in FIG. 11.

The particular construction of the mechanisms at the various stations will now be described. Feeder mechanism 126 is shown in detail in FIG. 5. It includes a frame 132 with a central passage 133 therethrough. A portion of this passage is located in the center of a tube 134 that forms part of the frame. The frame carries a pneumatic cylinder 135 which encloses a piston 136. A rod 137 protrudes from the cylinder. A shuttle 138 has a sleeve 139 which makes a sliding fit over the tube 134, and which has a flange 140 to which the rod is attached. Movement of the piston back and forth in the cylinder moves the shuttle back and forth on the frame. The shuttle carries with it a clamp 141 which is actuated by a piston 142.

Another clamp 145 is provided in frame 132. This clamp is operated by a piston 146. A cutoff die 127 has a pair of cooperating edges 147, 148. One or both of these edges can be moved for cutting off the tubing. The preferred arrangement is as shown, with edge 147 stationary on the frame, and edge 148 moved up and down by piston 150. Passage 133 is aligned with a stopping place for the holders so that tubing moved along by the shuttle is thrust into a holder where it is restrained by a stop 151.

A control circuit for automatically operating the elements of this machine will not be described in detail, because there are obviously a large number of circuits capable of doing it, and also the individual mechanisms could be operated by hand controls, if desired. The motive means and limiting devices which will ordinarily be made available for actuating the mechanisms at the individual stations will be disclosed in the interest of completeness, only the circuitry controlling the flow of motive power to these motive means being eliminated.

Limit switches 152, 153 are associated with stop 151 and shuttle 138, respectively. Pressurized fluid, either hydraulic or pneumatic, which can be admitted to the cylinder at one side or the other of piston 142, will move the shuttle to the right or left.

Clamps 141 and 145 operate alternately. Clamp 141 will grasp the tubing while the shuttle moves to the left, thereby pulling the tubing along and moving it into a holder until the tubing strikes stop 151 and limit switch 152, the limit switch 152 acting to cut off power to the shuttle. The shuttle could additionally be restrained by positive stops. During the movement of the shuttle to the left, the cutoff die and clamp 145 are in their lowermost positions and disengaged from the tubing. Limit switch 152, when struck, can be used to send power to clamp 145 to engage it to the tubing, actuate the die to cut off the piece that was fed, disengage clamp 141, and provide fluid to piston 142 to retract the shuttle. Limit switch 153 will be struck when the shuttle is fully retracted, and can be used to direct fluid under pressure to retract the cutoff die, reverse the clamp arrangements, and advance the shuttle so as to feed another length of tubing to the index plate.

After the feeding and cutoff action just described has taken place, the index plate is rotated, thereby advancing all holders by one station. This will place an empty holder opposite the feeder mechanism, and the action of the feeder mechanism will be repeated.

Cams 102–109 cooperating with switch 152a will signal arrival of holders at the new stations. In a fully automatic machine, all station mechanisms will simultaneously perform their functions, and an ordinary coincidence circuit can be used to hold the index plate against rotation until all operations are completed. Completion of all station operations can be used as a signal to advance the holders, and switch 152a can derive a signal from the cams to hold the plate from further advance until the next signal is received that all operations have been concluded.

A length 160 fed to holder 93 will be followed through the various operations. The first stop after the tube supply station is at station 112. Station 112 need not be provided, for it performs no function. However, in a machine of practical size, it is desirable to have a generous amount of travel between the tube supply station and the first of the pre-heat stations in order to gradually move the length of tubing to a properly aligned position. Therefore, at station 112 the tubing has moved about even with ramp section 121, so that had it for some reason sprung far to the left it would by this time have begun to ride up the ramp section. The next actuation will move the length of tubing onto backup section 123 along which it rides as it moves past stations 113, 114, and 115. This accurately positions the right-hand end of the length of tubing relative to these succeeding stations.

Primary pre-heat station 113 is shown in FIGS. 5, 6, and 9. As best shown in FIG. 9, this station includes a pair of heater blocks 162, 163 which are mounted to solenoids 164, 165, respectively, so as to be reciprocable toward and away from each other. The devices of this station and of all other stations are mounted to the frame of the machine, and the index plate rotates relative to it. The heater blocks respectively have heating coils 166, 167 to maintain them at a desired heat, and cutouts 168, 169, so that as the heater blocks are brought toward each other against the tubing, they surround and contact a substantial proportion of the perimeter of the tubing near the end to be sealed. Solenoid leads 170, 171, 172, 173 can be connected to a power source through a switch (not shown) to run the heater blocks toward and away from each other. Heater leads 174, 175, 176, 177 conduct current to heat the blocks.

Station 114 is a secondary pre-heat station provided with heater blocks 178, 179 mounted to solenoids 180, 181, respectively. The heater blocks are provided with heater coils 182, 183, respectively. The solenoids and coils are provided with leads the same as in the device of FIG. 6. Anvil faces 184, 185 face toward each other. Chamfers 186, 187 (see FIG. 7) are provided at the edge of the anvil faces.

Sealing station 115 is shown in FIG. 8. It has sealing blocks 188, 189 mounted to solenoids 190, 191. These blocks have flat anvil faces 192, 193 which are moved toward and away from each other by action of the solenoids to compress the pre-heated flattened end 194 of the tubing between them. These sealing blocks may, but usually will not, have heating coils in them, for the reason that it has been found that a better and more reliable seal is obtained by heating the tubing in two pre-heat stages, and then sealing at a final heat stage without heat. This avoids overheating the tubing while it is under heavy pressure, and minimizes melting and charring of the tubing. It has also been found that it is better to have a plurality of heat stations to gradually heat up the tubing. In a production-type machine, this gradual effect is better provided by heating at a plurality of stations, because the heating operation is one of the slowest. To heat the tubing gradually at only a single station would slow down the entire machine. After the length of tubing leaves sealing station 115, it moves beyond backup section 123 and reaches cooling station 116. A blast of cool air from nozzle 129 cools the heated tip. It may also move the tubing to the left in FIG. 5. The purpose of ramp section 122 is to reposition the tubing so that it will be correctly placed when it reaches filler station 117.

Filler station 117 is shown schematically in FIG. 10 where a stop member 195 is shown with a cavity 196 in which the sealed end rests. This cavity enables the end of the tubing to buckle a bit, without escaping from the holder.

The stop member is supported by a spring 197 which gives the stop member the ability to yield a bit to compensate for slight errors in adjustment of filling rates and also to hold the tubing firmly in place in its holder.

An injection needle 200 having a longitudinal interior passage therethrough and a tapered free end is centilevered from the carriage 201 with the axis of movement of the carriage and the longitudinal axis of the needle aligned. The carriage has a pair of axially extending slides 202, 203 engaged by wheels 204 on a framework 205.

An extension 206 of the carriage mounts a pair of adjustable stops 207, 208 whose path of movement intersects a pair of limit switches 209, 210. A cylinder 211 is mounted to the framework and a piston 212, and the cylinder is connected through rod 213 to the carriage so that fluid admitted to the cylinder on one side or the other of the piston under controls set by limit switches 209 and 210 reciprocates the carriage and the needle. The rate of carriage movement can, of course, be adjusted by appropriate restrictions in the fluid supply lines connected to the cylinder.

The carriage has mounted to it and aligned with the needle a plunger assembly 214 which is fluidly connected with a grease chamber 215 which receives grease from a hose 216. The plunger assembly includes a plunger 217 actuated by a piston-cylinder assembly 218 which is timed with the reciprocation of the chamber so that the piston moves to the right in its cylinder when the carriage is moved to the left, thereby making room for grease in chamber 215, and which moves to the left to expel grease from the needle and inject it into the tubing as the carriage moves to the right. A valve 218a opens to admit grease under pressure from hose 218b when the plunger moves to the right in cylinder 215, and closes when the plunger moves to the left. The rate of flow of the grease to the tubing is of course coordinated with the rate of retraction of the needle in the tubing so that the tubing is entirely filled up. This is accomplished by coordinating the rate of movement of the plunger in chamber 215 with the rate of movement of the carriage. The flexibility of the tubing between the stop and its abutment with the frame is enough to compensate for small excessive rates of supply of the grease.

From the filler station, the tubing is moved to the ejector station shown in FIG. 5, which ejector station includes ejector mechanism that has a punch 220 which is axially reciprocable to force the filled tubing out of its respective holder, at which time the filled tubing may be packaged for shipment.

The operation of the portion shown in FIGS. 1–4 will first be described. The object of this part of the machine is to provide a steady bias force on the material as it is withdrawn by a force exerted at point 72 by a device which ultimately utilizes the material. This is a demand-type machine. It remains static with the material held in readiness, waiting for an outside demand for the material. It replenishes material withdrawn from the U-shaped path to keep available a supply of material under a predetermined tension. When the bias wheel is in its lowermost position as shown in solid line in FIG. 1, there is a U-shaped path of tubing which is weighted down by the bias wheel 37. This is the longest length of path. Pulling on the tubing at point 72 will withdraw tubing, meanwhile raising the bias wheel and shortening the path (motor 24 being stopped). When the bias wheel nears the upper end of its travel, more tubing needs to be supplied to the path. This is accomplished by contact of the cam with start switch 51, which starts motor 24 in operation. This withdraws tubing from the reel at a rate faster than it is being withdrawn from point 72, and supplies it to the U-shaped path, lengthening the same. This lowers the bias wheel until the cam strikes stop switch 52 which shuts off motor 24. Then the cycle is repeated. Slots 48 and 49 extend somewhat above and below the locations at which the switches are actuated, to allow for lag of the device.

It will be noted that the effect of the positive engagement of the drive wheel on the tubing is to isolate the tubing in the U-shaped path from forces other than those exerted by the bias wheel and the withdrawing forces at point 72. Thus the tubing in the U-shaped path is independent from conditions at the reel, or conditions between the reel and the drive wheel.

In the rest condition, machine 10 keeps a supply of material at a predetermined tension which is determined by the weight of the bias wheel. This tension changes, of course, when a take-off pull is exerted at point 72 which raises the bias wheel. This slightly increases the tension. Also, the tension will be decreased somewhat when there is no take-off force, but the drive wheel is supplying material for the U-shaped path, because the bias wheel is moving downwardly.

There are also combinations of the above conditions such as the state which occurs when the material is concurrently withdrawn at point 72 and supplied to the path by the drive wheel. The bias wheel under this circumstance moves gradually downward, because, although the machine can be set so that supply by the drive wheel is equal to the rate of withdrawal, thereby keeping the tension steady, still, intermittent operation of the drive wheel will be more frequently encountered. The machine is inherently capable of operating intermittently, and ordinarily this will be preferred, since such an arrangement assures that there will be a constant supply of tubing, even if demand by the using machine should speed up slightly, or if machine 10 should slow down somewhat; that is to say, this machine is always capable of supplying material faster than the demand. Thus it is capable of handling a wide range of rates which are different from the single rate which could be obtained if the drive wheel rate is always to be kept at the rate which the material is withdrawn at point 72.

The extremes of tension variation occur when the demand is off and the drive wheel supplies the path, and when the demand is on and the drive wheel is stopped. However, the speed rates involved in the use of this machine are ordinarily of the order of only a few feet per minute, and the rate of upward or downward movement of the bias wheel is even less than that, and much of the time the variation is less because of a concurrence of demand and operation of the drive wheel. These variations are quite small. Thus the tension is sensibly constant at all times, and is a direct function of the weight of the bias wheel.

The circuit of FIG. 4 operates in the following manner. It is shown in its repose condition which would exist when the bias wheel had been all the way down to strike the stop switch, and is upwardly bound as a result of a demand pull at point 72. At this repose condition, start switch 51 is open and stop switch 52 is closed, and the relay is not actuated. Thus relay switches 65 and 66 are both open, and motor 24 is stopped.

When the bias wheel reaches the upper end of its movement, the cam will momentarily close start switch 51. This makes the circuit from the battery through the coil and actuates the relay. This closes switches 65 and 66 and turns on motor 24. It also jumpers the coil to switch 65 through stop switch 52 so that even after the start switch is opened by virtue of the bias wheel's moving downwardly, the relay remains actuated through a captive circuit through stop switch 52, and motor 24 remains in operation.

The above condition is maintained, with motor 24 in operation feeding the tubing to the U-shaped path until cam 50 reaches the actuator of stop switch 52. This momentarily opens stop switch 52 and breaks the captive circuit. Start switch 51 is spring-loaded open. Therefore, the relay becomes deactuated when both switches 65 and 66 open, thereby stopping motor 64 and leaving the captive circuit broken. This is the repose condition referred to above which will be maintained until the bias wheel again reaches its upper limit, at which time the cycle will be repeated.

The operation of the machine starting from point 72 should be evident from the foregoing. With respect to temperatures at the pre-heat stations, these should be well below the temperatures at which the material will be adversely affected, and this is one of the reasons for providing a plurality of pre-heat sections so that the tubing may be more gradually heated to a proper sealing temperature. The times of application of the heat and sealing pressure will be adjusted by trial and error on the particular machine for each type of material.

With respect to the filler station, it will be recognized that a number of techniques may be utilized to fill the tube, but it has been found most advantageous to insert the needle all the way into the tubing in order to avoid trapping air therein. The coordination of needle withdrawal timed with grease injection rates will avoid any tendency for voids to be formed in the grease.

This invention provides a mechanism for manufacturing B sleeves which can be carried out expeditiously and can be adapted to rapid and automatic machine operation. The mechanism shown in FIGS. 5-11 can of course obtain its supply of tubing from mechanisms other than that of FIGS. 1-4, but their combination provides an unusually effective means for providing manufactured B sleeves which closely resemble each other dimensionally from piece to piece.

This invention is not to be limited by the embodiments shown in the drawings and described in the description which are given by way of example and not of limitation, but only in accordance with the scope of the appended claims.

What is claimed is:

1. A machine for cutting off lengths of tubing, sealing one end thereof, and filling it with a fluid material comprising: an index plate having a plurality of holders for receiving and carrying pieces of tubing, said plate being intermittently movable along a path; a plurality of operation performing stations disposed along said path, at which stations the index plate stops the pieces of tubing, said stations including the following: a tube supply station adapted to feed a discrete length of tubing to a holder aligned therewith; a primary pre-heat station adapted to apply heat to the end of said tubing to be sealed, and a secondary pre-heat station adapted to apply additional heat to said ends; primary and secondary pre-heat stations comprising a pair of heated blocks movable toward and away from each other, the primary pre-heat blocks being so shaped as to embrace substantially the entire periphery of the end of the tubing to be sealed for heating the same, and the secondary pre-heat station having a pair of movable blocks which have chamfered edges to provide for a gradual transition between the sealed portion of the tubing and that which is to remain open; a sealing station adapted to apply pressure to the heated end for sealing the same; a cooling station adapted to discharge cooling fluid at said sealed end; a filler station adapted to fill the tubing with a fluid material from the open end, comprising an axially reciprocable ejector needle adapted to enter the tubing to the bottom thereof, a carriage carrying said needle and supplying fluid material thereto, and motive means for said carriage adapted to axially shift the said needle at a rate proportional to the expulsion of fluid material therefrom whereby as the ejector needle is withdrawn from a piece of tubing being filled, the needle leaves a deposit of fluid material in the tubing which entirely fills the same; and an ejector station adapted to eject the tubing from its holder, whereby material fed to the plate is moved intermittently to each of the above stations in the recited order for the recited operations.

2. A machine according to claim 1 in which the tube supply station includes a shuttle mechanism having a central opening through which the tubing to be treated by the machine is fed; a shuttle axially reciprocable of said material; and a frame, said frame and shuttle having alternately actuated clamps for grasping the material and a cutoff die on the frame actuable with the clamp in the frame, whereby the shuttle with its clamp can grasp the tubing and draw it into the machine whereupon the cut-off die and clamp and frame are actuable to grasp the tubing while the shuttle is withdrawn sufficiently that the clamp arrangement is reversed for supplying the next length of tubing to be treated.

3. Apparatus according to claim 1 in which means are provided for feeding material to the tube supply station comprising a drive wheel for withdrawing said material from a source; engagement means for holding said material in non-slipping engagement with the drive wheel, said engagement means including an endless belt, a substantial proportion of whose periphery is in contact with the periphery of the drive wheel and with the material; a vertically reciprocable bias wheel; an axle to which said bias wheel is mounted; a guide with a vertical slot in which the axle is reciprocable and which constrains the bias wheel to vertical reciprocation; motor means powering the drive wheel; control means controlling the operation of the motor means and comprising a power circuit including a pair of limit switches contactible by the axle at the upper and lower limits of its reciprocation for starting and stopping the motor, respectively; and a take-off wheel, the wheels being so disposed and arranged that the material departs downwardly from the drive wheel and arrives directed upwardly at the take-off wheel to form a U-shaped path open upwardly, the material conforming to a portion of the periphery of the bias wheel and supporting the bias wheel.

4. Apparatus according to claim 3 in which the source of material is a drum, the drum being provided with a restraining brake.

5. Apparatus according to claim 3 in which the engagement means additionally include tension means for keeping the endless belt under predetermined tension.

6. Apparatus according to claim 3 in which the circuit includes a captive relay which keeps power on the motor means from the time the lower switch is contacted by the axle until the upper switch is so contacted, at which time the motor means is stopped.

7. A machine for cutting off lengths of tubing, sealing one end thereof, and filling it with a fluid material comprising: an index plate having a plurality of holders for receiving and carrying pieces of tubing, said plate being intermittently movable along a path; a plurality of operation performing stations disposed along said path, at which stations the index plate stops the pieces of tubing, said stations including the following: a tube supply station adapted to feed a discrete length of tubing to a holder aligned therewith; a primary pre-heat station adapted to apply heat to the end of said tubing to be sealed; a secondary pre-heat station adapted to apply additional heat to said end, each of said pre-heat stations comprising a pair of heated blocks movable toward and away from each other, the primary pre-heat blocks being so shaped as to embrace substantially the entire periphery of the end of the tubing to be sealed for heating the same, the movable blocks of the secondary pre-heat section including chamfered edges to provide for a gradual transition between the sealed portion of the tubing and that which is to remain open; a cooling station adapted to discharge cooling fluid at said sealed end; a filler station adapted to fill the tubing with a fluid material from the open end; and an ejector station adapted to eject the tubing from its holder, whereby tubing fed to the plate is moved intermittently to each of the above stations in the recited order for the recited operations.

8. A machine for cutting off lengths of tubing, sealing one end thereof, and filling it with a fluid material comprising: an index plate having a plurality of holders for receiving and carrying pieces of tubing, said plate being intermittently movable along a path; a plurality of operation performing stations disposed along said path, at which stations the index plate stops the pieces of tubing, said stations including the following: a tube supply station adapted to feed a discrete length of tubing to a holder aligned therewith; a primary pre-heat station adapted to apply heat to the end of said tubing to the sealed; a secondary pre-heat station adapted to apply additional heat to said end; a sealing station adapted to apply pressure to the heated end for sealing the same; a cooling station adapted to discharge cooling fluid at said sealed end; a filler station adapted to fill the tubing with a fluid material from the open end comprising an axially reciprocable ejector needle adapted to enter the tubing, and a carriage carrying said needle and supplying fluid material thereto, and motive means for said carriage adapted to axially shift the said needle at a rate proportional to the expulsion of fluid material therefrom whereby as the ejector needle is withdrawn from a piece of tubing being filled the needle leaves a deposit of fluid material in the tubing which entirely fills the same; and an ejector station adapted to eject the tubing from its holder, whereby tubing fed to the plate is moved intermittently to each of the above stations in their recited order for the recited operations.

References Cited in the file of this patent

UNITED STATES PATENTS

| | | |
|---|---|---|
| 2,217,336 | Eden | Oct. 8, 1940 |
| 2,277,783 | Scharf | Mar. 31, 1942 |
| 2,575,544 | Zinn | Nov. 20, 1951 |
| 2,914,893 | Berst | Dec. 1, 1959 |
| 2,935,831 | Saumsiegle | May 10, 1960 |
| 2,951,326 | Dorman et al. | Sept. 6, 1960 |